United States Patent
Paul et al.

(10) Patent No.: US 12,017,555 B2
(45) Date of Patent: Jun. 25, 2024

(54) VEHICLE SYSTEM AND METHOD

(71) Applicant: Transportation IP Holdings, LLC, Norwalk, CT (US)

(72) Inventors: Anthony D. Paul, Anchorage, AK (US); Nathan Thomas North, Seattle, WA (US); Milan Karunaratne, Orange, CA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 410 days.

(21) Appl. No.: 17/504,342

(22) Filed: Oct. 18, 2021

(65) Prior Publication Data

US 2023/0124452 A1    Apr. 20, 2023

(51) Int. Cl.
| | |
|---|---|
| *B60L 53/36* | (2019.01) |
| *B60L 53/53* | (2019.01) |
| *B60L 53/54* | (2019.01) |
| *B60L 53/62* | (2019.01) |
| *B60L 53/66* | (2019.01) |
| *B60L 58/00* | (2019.01) |

(52) U.S. Cl.
CPC .............. *B60L 53/36* (2019.02); *B60L 53/53* (2019.02); *B60L 53/54* (2019.02); *B60L 53/62* (2019.02); *B60L 53/66* (2019.02); *B60L 58/00* (2019.02)

(58) Field of Classification Search
CPC .......... B60L 53/36; B60L 53/53; B60L 53/54; B60L 53/62; B60L 53/66; B60L 58/00
See application file for complete search history.

(56) References Cited

U.S. PATENT DOCUMENTS

| | | | |
|---|---|---|---|
| 9,778,653 B1 | 10/2017 | McClintock et al. | |
| 10,802,490 B2 | 10/2020 | Harris et al. | |
| 2017/0136891 A1* | 5/2017 | Ricci | B60L 53/64 |

(Continued)

FOREIGN PATENT DOCUMENTS

| | | | |
|---|---|---|---|
| JP | 2012230523 A | | 11/2012 |
| JP | 2013192285 A | * | 9/2013 |
| JP | 2013192285 A | | 9/2013 |

OTHER PUBLICATIONS

Office Action for corresponding JP Application No. 2022-125739 dated Jul. 5, 2023 (14 pages).

(Continued)

*Primary Examiner* — Edwin A Young
(74) *Attorney, Agent, or Firm* — K&L Gates LLP

(57) ABSTRACT

A vehicle system and method includes determining that a state of charge of an energy storage assembly of a receiving vehicle is insufficient to power the receiving vehicle to an upcoming location based on a difference between the state of charge and a needed amount of energy from the energy storage assembly to power the receiving vehicle to the upcoming location. The receiving vehicle may be controlled to move to an intermediate location that includes an increased traffic area or to a first donating vehicle location of plural different donating vehicle locations. The first donating vehicle location includes a predicted upcoming location of a first donating vehicle. The receiving vehicle receives energy from the first donating vehicle to charge the energy storage assembly of the receiving vehicle while both the first donating vehicle and the receiving vehicle area moving at the intermediate location.

19 Claims, 4 Drawing Sheets

(56) References Cited

U.S. PATENT DOCUMENTS

2019/0193764 A1    6/2019    Cooper et al.
2020/0074575 A1    3/2020    Efird et al.
2023/0015182 A1*   1/2023    Shune .................... B60L 53/57

OTHER PUBLICATIONS

Office Action for corresponding JP Application No. 2022-125739 dated Jan. 12, 2024 16 pages).
Extended European Search Report for corresponding EP Application No. 22200491.3 dated Apr. 4, 2023 (9 pages).
Will Sabel Courtney "Amazon Patents Drone to Recharge Electric Cars While Driving", The Drive, Brookline Media Inc., Oct. 16, 2017 (13 pages).
Peter Holderith "Toyota Patent Shows Self-Driving Drone Tankers for Car-to-Car Recharging and Refueling", The Drive, Brookline Media Inc., Nov. 16, 2020 (7 pages).

* cited by examiner

VEHICLE SYSTEM AND METHOD

BACKGROUND

Technical Field

The subject matter described herein relates to a vehicle system having an energy storage assembly and related method.

Discussion of Art

As vehicle systems move along routes between current and upcoming location destinations, the amount of available energy to power the vehicle systems changes. The energy may be electric energy, or a fluid energy such as diesel fuel, liquid hydrogen, or gasoline, and may be used to power propulsion loads and/or non-propulsion loads of the vehicle systems. The amount of available energy for the vehicle system to use or draw from changes as the vehicle system operates. For example, a state of charge of an energy storage assembly of the vehicle system may decrease responsive to the propulsion and non-propulsion loads pulling energy from the energy storage assembly. As the amount of available energy changes, it may be determined that the amount of available energy is insufficient to reach the destination location. For example, the vehicle systems may need to recharge and/or refuel prior to the vehicle systems reaching a destination location. If a vehicle system needs to make a stop to refuel or recharge the energy storage assembly (e.g., battery, fuel cell, or the like) while traveling in an area with increased vehicle density, the stop may disrupt travel of other vehicle systems moving in the area or along the same route. For example, other vehicles may need to change operating parameters (e.g., slow down, speed up, stop, or the like) in order to accommodate the vehicle system that needs to refuel or recharge. Therefore, a need exists for allowing vehicle systems to recharge or refuel while the vehicle systems remain in motion to reduce an amount of vehicle disruption.

BRIEF DESCRIPTION

In one or more embodiments, a method includes determining that a state of charge of an energy storage assembly of a receiving vehicle is insufficient to power the receiving vehicle to an upcoming location based on a difference between the state of charge of the energy storage assembly and a needed amount of energy from the energy storage assembly to power the receiving vehicle to the upcoming location. The receiving vehicle may be controlled to move to an intermediate location that includes an increased traffic area or to a first donating vehicle location of plural different donating vehicle locations. The increased traffic area has a greater vehicle density relative to a first reduced traffic area between a current location of the receiving vehicle and the increased traffic area or relative to a second reduced traffic area between the increased traffic area and the upcoming location of the receiving vehicle. The first donating vehicle location includes a predicted upcoming location of a first donating vehicle. The receiving vehicle receives energy from the first donating vehicle to charge the energy storage assembly of the receiving vehicle while both the first donating vehicle and the receiving vehicle area move at the intermediate location.

In one or more embodiments, a method includes measuring a first state of charge of a first energy storage assembly of a donating vehicle, and calculating a first needed amount of energy from the first energy storage assembly of the donating vehicle to power the donating vehicle to at least a first upcoming location. A second state of charge of a second energy storage assembly of a receiving vehicle is measured, and a second needed amount of energy from the second energy storage assembly to power the receiving vehicle to at least a second upcoming location is calculated. The second state of charge of the second energy storage assembly of the receiving vehicle is increased by transferring at least part of energy store in the first energy storage assembly of the donating vehicle to the second energy storage assembly of the receiving vehicle. The second state of charge of the second energy storage assembly is increased to provide the second energy storage assembly with sufficient energy to power the receiving vehicle to at least the second upcoming location.

In one or more embodiments, a vehicle system includes an energy storage assembly disposed onboard a receiving vehicle. A controller includes one or more processors configured to determine a state of charge of the energy storage assembly to power the receiving vehicle to an upcoming location based on a needed amount of energy from the energy storage assembly to power the receiving vehicle to the upcoming location. The controller is configured to control the receiving vehicle to move to an intermediate location that includes an increased traffic area or to a first donating vehicle location of plural different donating vehicle locations. The increased traffic area has a greater vehicle density relative to a first reduced traffic area between a current location of the receiving vehicle and the increased traffic area, or a second reduced traffic area between the increased traffic area and the upcoming location of the receiving vehicle. The first donating vehicle location includes a predicted upcoming location of a first donating vehicle. The energy storage assembly receives energy from the first donating vehicle to charge the energy storage assembly of the receiving vehicle while both the first donating vehicle and the receiving vehicle area move at the intermediate location.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
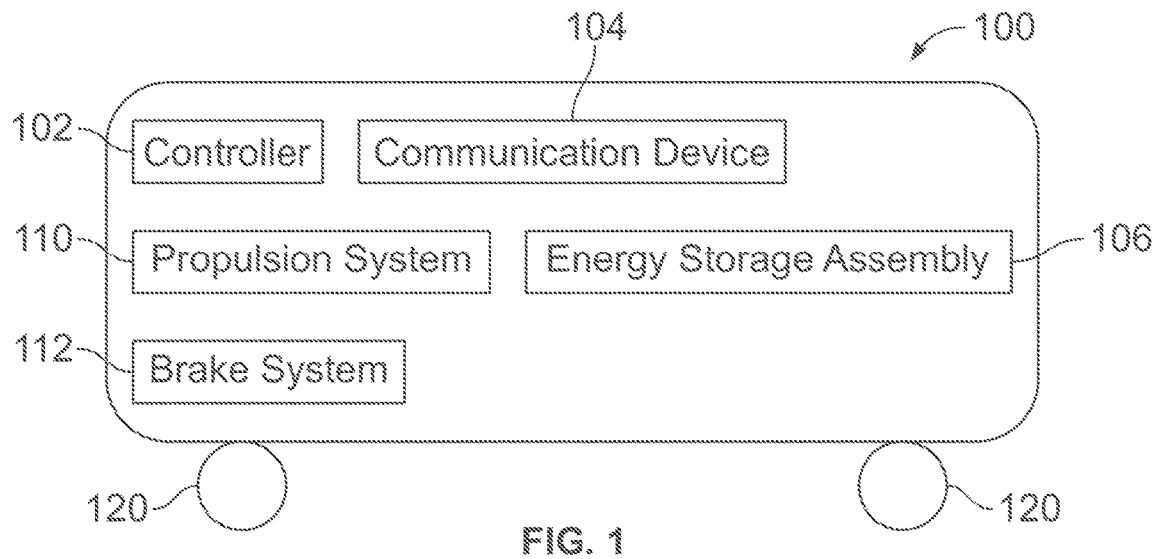
FIG. 1 illustrates a vehicle system in accordance with one embodiment.

Embodiments of the subject matter described herein relate to a vehicle system that includes an energy storage assembly and method of operation. The energy storage assembly may store energy that is used to power propulsion and non-propulsion loads of the vehicle system. A state of charge of the energy storage assembly indicates a level or amount of energy that is stored within the energy storage assembly and available for the vehicle system. The state of charge of the energy storage assembly may change during operation of the vehicle system. As the state of charge of the energy storage assembly changes, the vehicle system, or an off-board dispatch system, may determine that the state of charge of the vehicle system is insufficient to power the vehicle system to an upcoming location. The upcoming location may be a destination location, a recharging or refueling location, or a location along the route where the vehicle system is scheduled to stop (e.g., to load or unload cargo, to add or remove other vehicles mechanically coupled with the vehicle system, or the like). In one or more embodiments, the state of charge of the energy storage assembly may be sufficient to reach the upcoming location, but the remaining state of charge may be less than a predetermined required threshold of available energy.

If it is determined that the energy storage assembly has insufficient energy to power the vehicle system to the upcoming location, the vehicle system may be directed to move toward an intermediate location where the vehicle system (e.g., receiving vehicle system) may receive energy from another vehicle system (e.g., a donating vehicle system). The receiving vehicle system and the donating vehicle system may be the same type and/or modality of vehicles. For example, the receiving and donating vehicle systems may be the same type and/or model of automobile, rail vehicle, agricultural vehicle, aircraft (manned or unmanned), water vessel, mining vehicle, or the like.

The intermediate location may be an increased traffic area relative to the current location of the vehicle system. For example, the increased traffic area may include plural different vehicles that may be able to donate or transfer excess energy to the receiving vehicle system. As another example, the intermediate location may be a predicted upcoming location of a donating vehicle system. For example, the donating vehicle system may be identified by the receiving vehicle system, and the receiving vehicle system may receive communication indicating the predicted upcoming location where the receiving vehicle system may meet with the donating vehicle system. In one or more embodiments, the receiving vehicle system may be directed to move toward the intermediate location and toward a donating vehicle system. Optionally, the donating vehicle system may be directed to move toward the receiving vehicle system.

The receiving vehicle system may receive some energy from the donating vehicle system. The amount of energy received from the donating vehicle system may be based on a needed amount of energy of the receiving vehicle system, based on an available excess amount of energy of the energy storage assembly of the donating vehicle system, based on a trip plan and/or schedule of the receiving and/or donating vehicle system, or the like. The energy may be received within the energy storage assembly of the receiving vehicle system, and increases the state of charge of the energy storage assembly. The receiving vehicle system may receive the energy from the donating vehicle system while the receiving and donating vehicle systems are moving (e.g., in the same direction) and/or while the vehicle systems are stationary. In one embodiment, the increased state of energy may be sufficient to power the receiving vehicle system to reach the upcoming location of the receiving vehicle system. In another embodiment, the increased state of energy may be insufficient to power the receiving vehicle system to the upcoming location, and the receiving vehicle system may need to receive energy from a second donating vehicle system.

FIG. 1 illustrates a vehicle system 100 in accordance with one embodiment. The vehicle system may be a propulsion-generating vehicle such as, but not limited to, a locomotive or other rail vehicle, an automobile, a truck, a bus, a mining vehicle, a marine vessel, an aircraft (manned or unmanned, such as a drone), an agricultural vehicle, or another off-highway vehicle. In the illustrated embodiment, the vehicle system includes plural wheels 120 in contact with a route along which the vehicle system moves. Optionally, the vehicle system may be a marine vessel or an aircraft and may be devoid wheels, or may not require wheels to propel the vehicle system. For example, the vehicle system may move along a waterway, in a flight path, or along another route where wheels of the vehicle system are not necessary. In one or more embodiments, the vehicle system may include two or more vehicles that may travel together (by being mechanically coupled or by being mechanically separate but logically coupled and communicating with each other to travel together, such as in a convoy or a locomotive consist where multiple locomotives communicate and operate together as a train). At least one vehicle of the vehicle system may be a propulsion-generating vehicle, and optionally the vehicle system may include one or more non-propulsion generating vehicles.

The vehicle system includes a controller 102 disposed onboard the vehicle system. The controller may represent a control module, and can include one or more processors, microcontrollers, or other logic-based devices and/or associated software or instructions, for carrying out one or more operations described herein. The controller controls operations of the vehicle system, such as by controlling tractive efforts and/or braking efforts provided by a propulsion system 110 (e.g., a traction motor, an engine, or the like) and braking system 112. The tractive components operably coupled with the propulsion and/or brake systems (e.g., traction motors, brakes such as air brakes, or the like) may control movement of the wheels (and/or axles joined to the wheels, not shown) of the vehicle system to generate tractive efforts to propel the vehicle system along the route. In addition to providing propulsion force to propel the vehicle system, the propulsion and/or brake systems can act to slow or stop movement of the vehicle system using dynamic braking.

The controller may be manually operated by receiving instruction signals from an input device (not shown) (e.g., a device that receives input from an operator such as, but not limited to, a touchscreen, a joystick, a keyboard, a switch, a wheel, a microphone, or the like) based on manually input from an operator at the input device. An output device (not shown) can provide information to the operator, such as current operational settings of the vehicle system, designated operational settings of a trip plan, a current amount of electric energy stored onboard the vehicle system, a current storage capacity of an onboard energy storage assembly 106, or the like.

The vehicle system includes a communication device 104. The communication device may be set up for one or both of wired or wireless communication. For example, the communication device can represent transceiving circuitry, one or more antennas, modems, communication cables, or the like. The communication device may communication (e.g., receive and/or provide data signals) with the controller onboard the vehicle system, with an off-board controller (not shown), with other vehicles traveling in a consist with the vehicle system, with other vehicles within a predetermined area or location, or the like.

In one embodiment, the communication device can interact with other systems via one or more communication types. Suitable communication types can include, but are not limited to, cellular networks (e.g., the Global System for Mobile Communications (GSM)), mesh networks using Ethernet standards, wireless communication protocols (e.g., Bluetooth), radio and shortwave communication types, or the like. In one or more embodiments, where two or more communication types are present, the communication device may translate some or all of a data stream from one type to another. Similarly, different data protocols may be used. Such translation may allow the communication device to act as a transference point for data transmission. The translation may allow for different types of equipment (e.g., first and second vehicle systems may each use communication types different from each other to communicate with each other via the communication system). The communication device may switch types, protocols, and/or communication pathways in response to delegation of signal or failure of one pathway. This may provide redundancy of communication by the communication system. In one embodiment, the communication device may decrypt, decompile, or disaggregate information, parse information, and send along all or part of a message (e.g., alone or combined with new data, or with encryption, or both). The communication device may be the same as or similar to other communication devices or communication systems described herein.

The energy storage assembly 106 may represent one or more energy systems and/or components that store energy used to operate the vehicle system. The energy may be used to provide power to propulsion loads of the vehicle system and/or non-propulsion loads of the vehicle system (e.g., air-conditioning, coach lighting, passenger power outlet supply, or the like). As one example, the energy may be in the form of electric energy. The energy storage assembly may include electric components that allow and/or control the energy storage assembly to receive electric current from a source off-board the vehicle system (e.g., an off-board charging station, another vehicle system, or the like). Additionally, the energy storage assembly may include components that allow and/or control the energy storage assembly to donate electric current to an electric energy recipient. Optionally, the energy may be a fluid type of energy (e.g., diesel, gasoline, hydrogen, liquid hydrogen, or the like), and the energy storage assembly may include components that allow and/or control the receipt and/or donation of fuel to and/or from the vehicle system.

In one or more embodiments, the vehicle system may include one or more sensors operably coupled with the energy storage assembly that may measure or sense a state of charge of the energy storage assembly. The controller may receive the sensed data from the one or more sensors and measure or determine the state of charge of the energy storage assembly. The controller may calculate a needed amount of energy that the vehicle system will need to power the vehicle system to an upcoming location along the route. The controller may determine that the state of charge of the energy storage assembly is insufficient to power the vehicle system to the upcoming location. In one or more embodiments, the controller may identify a location of an off-board refueling or recharging source, and may control the propulsion and/or braking systems to move the vehicle system to the refueling or recharging location.

Alternatively, the controller may determine whether a donor vehicle system may be within a predetermined proximity (e.g., within 1 mile, within 5 miles, within 50 miles, within 100 miles or the like). If a donor vehicle system is within the predetermined proximity, the controller may control operations of the vehicle system to move the vehicle system toward the donor vehicle. Additionally or alternatively, the vehicle system may communicate with the donor vehicle to direct the donor vehicle to move toward the vehicle system.

Figure 2:
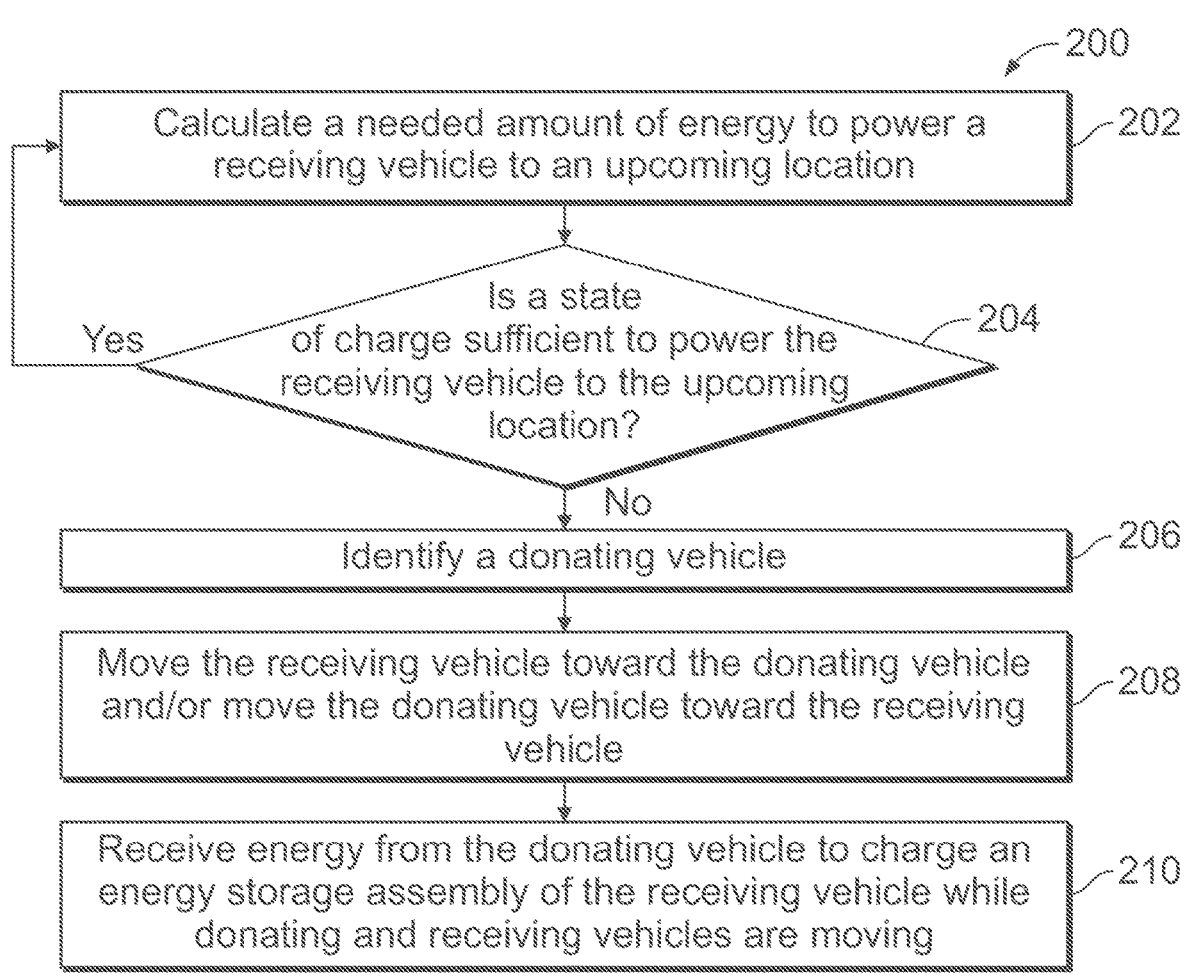
FIG. 2 illustrates a flowchart of one example of controlling receiving and/or donating energy between two or more vehicle systems in motion in accordance with one embodiment.
Figure 3:
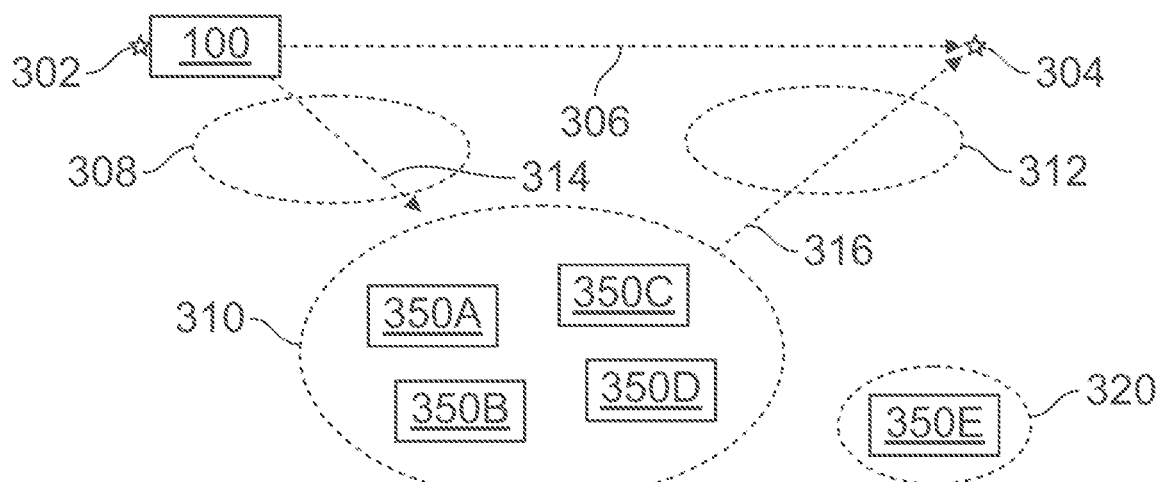
FIG. 3 illustrates a schematic of movement of plural vehicle systems in accordance with one embodiment.

FIG. 2 illustrates a flowchart 200 of one example of controlling receiving and/or donating energy between two or more vehicle systems in motion in accordance with one embodiment. FIG. 3 illustrates a schematic of movement of plural vehicle systems in accordance with one embodiment. The flowchart illustrated in FIG. 2 will be described with reference to the schematic shown in FIG. 3.

The schematic illustrated in FIG. 3 indicates locations, routes, and areas or locations of the vehicle system 100 and plural other vehicle systems 350A-E. The other vehicle systems may be the same type and/or modality as the vehicle system 100. For example, the vehicle systems 100 and 350A-E may all be the same make and/or the same model of rail vehicles, the same make and/or model of automobiles, the same make and/or model of mining vehicles, the same make and/or model of marine vessels, the same make and/or model of aircraft, the same make and/or model of agricultural vehicles, the same make and/or model of mining equipment, or the like.

The vehicle system 100 may be referred to as a receiving vehicle or receiving vehicle system, such that the controller of the receiving vehicle determines that the energy storage assembly of the receiving vehicle needs to receive energy from another source. Additionally, the vehicle systems 350A-E may be referred to as donating vehicle systems. For example, the donating vehicle systems may have a surplus amount of energy within the respective energy storage assemblies, and may be available to donate at least some energy to another vehicle system.

In the illustrated embodiment of FIG. 3, the receiving vehicle system is disposed or located at a current location 302. The receiving vehicle system may be moving along a path 306 toward an upcoming location 304. The upcoming location may be a destination location, such as a final destination of a trip of the receiving vehicle system. Optionally, the upcoming location may represent a location where the energy storage assembly of the vehicle system may re-charge or refuel (e.g., an electric charging station, a fuel pump, or the like). Optionally, the upcoming location may represent a planned or unplanned stop location, such as where the vehicle system may load and/or unload cargo, may change operators, or the like.

In the illustrated embodiment, the donating vehicle system 350A-D are disposed within a first intermediate location 310, and the donating vehicle system 350E is disposed within a second intermediate location 320. The first and second intermediate locations may represent an area of increased traffic and/or a location of donating vehicle location. The schematic also indicates a first reduced traffic area 308 that is positioned between the current location of the receiving vehicle system and the intermediate location. Additionally or alternatively, the schematic may include a second reduced traffic area 312 that is positioned between the intermediate location and the upcoming location. The intermediate location may have a vehicle density that is greater than a vehicle density of the first reduced traffic area. Additionally or alternatively, the intermediate location may have a vehicle density that is greater than a vehicle density of the second reduced traffic area. For example, a larger number of vehicles may move within the intermediate location relative to the first and/or second reduced traffic areas.

In one or more embodiments, the receiving vehicle system may move from the current location to the upcoming location based on a trip plan or schedule of the receiving vehicle system. The trip plan may designate operational settings of the receiving vehicle system as a function of one or more of time, location, or distance along the route for the trip. For example, traveling according to the operational settings designated by the trip plan may reduce energy or fuel consumed and/or emissions generated by the vehicle relative to the vehicle traveling according to other operational settings that are not designated by the trip plan. For example, the trip plan may optimize travel of the vehicle. In one or more embodiments, the trip plan or schedule of the receiving vehicle system may include one or more charging locations where the receiving vehicle can charge the corresponding energy storage assembly. Optionally, the trip plan or schedule may include one or more grades, curves, or predicted weather conditions.

Returning to FIG. 2, at step 202, the controller of the receiving vehicle system may calculate a needed amount of energy to power the receiving vehicle to the upcoming location. The calculated amount of needed power may be based on the trip plan of the receiving vehicle system, the schedule of the receiving vehicle system, or the like. At step 204, a determination is made whether the current state of charge of the energy storage assembly is sufficient to power the receiving vehicle system to the upcoming location relative to the needed amount of energy from the energy storage assembly to power the receiving vehicle system to the upcoming location. For example, the controller may determine whether the energy storage assembly has a sufficient state of charge by measuring the state of charge of the energy storage assembly, and calculating the needed amount of energy from the energy storage assembly to power the receiving vehicle to the upcoming location. The needed amount of energy may be calculated and/or determined based on the trip plan or the schedule of the receiving vehicle system. Optionally, the needed amount of energy may be calculated based on route grades, curves predicted weather conditions, an amount of traffic or other vehicle systems moving within a predetermined area (e.g., that may cause movement of the receiving vehicle system to need to change), a scheduled arrival time of the receiving vehicle system at the upcoming location, a required charging length of time for the receiving vehicle system to recharge, a scheduled arrival time, or the like.

In one or more embodiments, the needed amount of energy may be based on the state of charge of the energy storage assembly of the receiving vehicle system, the trip plan or schedule of the receiving vehicle system, and/or a percentage threshold of the state of charge that the energy storage assembly is to maintain while the receiving vehicle system is in transit. For example, the controller may determine that the state of charge of the energy storage assembly is sufficient to reach the upcoming location, but may determine that the remaining state of charge of the energy storage assembly may be less than a predetermined threshold (or within a percentage of the predetermined threshold) of remaining energy the energy storage assembly is directed to maintain. The controller may determine that the energy storage assembly has a sufficient amount of energy to reach the upcoming location, but may determine that the state of charge of the energy storage device after reaching the upcoming location may be outside of or less than the predetermined threshold.

In one or more embodiments, the controller may determine that the energy storage assembly does have sufficient energy to power the receiving vehicle system to the upcoming location, but may determine that the energy storage assembly should be recharged or refueled even if the needed amount of energy is less than the state of charge of the energy storage assembly of the receiving vehicle system. In one embodiment, the controller may determine that the state of charge of the energy storage assembly after the receiving vehicle system reaches the upcoming location will be below or less than a predetermined threshold. For example, the controller may determine that it may be more efficient to recharge or refuel the receiving vehicle system prior to the receiving vehicle system reaching the upcoming location. In another embodiment, the controller may determine that it is more efficient to recharge or refuel based on an amount of congestion around the upcoming location (e.g., congestion of similar or different vehicles, pedestrian congestion, a number of intersection routes, or the like). For example, in an area with greater congestion, there may be more donating vehicle systems available to share energy with the receiving vehicle system. In another embodiment, the controller may determine that it is more efficient to recharge or refuel the receiving vehicle system based on a location of a charging or fueling station (e.g., relative to the current location of the receiving vehicle system and/or the upcoming location), based on an amount of time it will take to recharge or refuel the energy storage assembly (e.g., a recharging or refueling speed of the charging or fueling station), or the like.

If the state of charge of the energy storage assembly of the receiving vehicle system is sufficient to power the receiving vehicle system to the upcoming location, then flow of the method returns to 202. The method may repeat while the receiving vehicle system is in motion, until the vehicle system reaches the upcoming location, if an operating parameter or setting of the vehicle system changes (e.g., thereby causing the needed amount of energy may change), or the like. Alternatively, if the state of charge of the energy storage assembly of the receiving vehicle system is insufficient to power the receiving vehicle system to the upcoming location, then flow of the method proceeds toward step 206. Optionally, if the controller determines that the energy storage assembly has sufficient energy but should be recharged or refueled, then flow of the method may proceed toward step 206.

At step 206, the controller identifies a potential donating vehicle system. The donating vehicle system may be identified based on a position of the donating vehicle system relative to the receiving vehicle system, a direction of travel of the donating vehicle system relative to the receiving vehicle system, the route along which the donating vehicle system is traveling relative to the route along which the receiving vehicle system is traveling, a vehicle density nearby or around the donating vehicle system, a state of charge of the energy storage assembly of the donating vehicle system, a location of the donating vehicle system relative to the upcoming location, the terrain between the receiving vehicle system and the donating vehicle system, the trip plan or schedule of the donating vehicle system, a needed amount of energy from the energy storage assembly of the donating vehicle system to power the donating vehicle system to a destination location according to the trip plan of the donating vehicle system, or any combination of two or more therein. In one or more embodiments, the donating vehicle system may be a designated donating vehicle system, and may travel along different routes to provide energy to one or more receiving vehicle system within an area. For example, the donating vehicle system may only move around the area to provide energy to other vehicle systems, and may have no other particular destination to which the donating vehicle system is to reach.

In one or more embodiments, the controller may identify the donating vehicle system 350A to be the vehicle system to donate energy to the receiving vehicle system. At step 208, the controller may control one or more settings of the propulsion system and/or brake system to control the receiving vehicle system to move toward a first intermediate location 310 and towards the location of the donating vehicle system 350A. The donating vehicle location may include a predicted upcoming location of the donating vehicle system. For example, the predicted upcoming location of the donating vehicle may be based on a speed of movement of the donating vehicle system, the trip plan of the donating vehicle system, the route along which the donating vehicle system moves, weather conditions of the donating vehicle system, or the like.

In one or more embodiments, the first intermediate location may be or include an increased traffic area that may include plural different donating vehicle systems. For example, the increased traffic area may have a greater vehicle density relative to a first reduced traffic area 308 between the current location of the receiving vehicle and the increased traffic area. As another example, the increased traffic area may have a greater vehicle density relative to a second reduced traffic area 312 between the increased traffic area and the upcoming location of the receiving vehicle system.

In one or more embodiments, the controller may identify the donating vehicle system, and may wirelessly communicate with the donating vehicle system to confirm that the donating vehicle system is able to donate energy to the receiving vehicle system. In one embodiment, the controller of the receiving vehicle system may request the controller of the donating vehicle system to control movement of the donating vehicle system to move toward the location, or predicted location, of the receiving vehicle system. Optionally, the controller of the receiving vehicle system may request the controller of the donating vehicle system to change one or more operating settings of the donating vehicle system (e.g., to change the predicted location of the donating vehicle system, to allow the receiving vehicle system to reach the donating vehicle system in a shorter amount of time, or the like).

Figure 4:
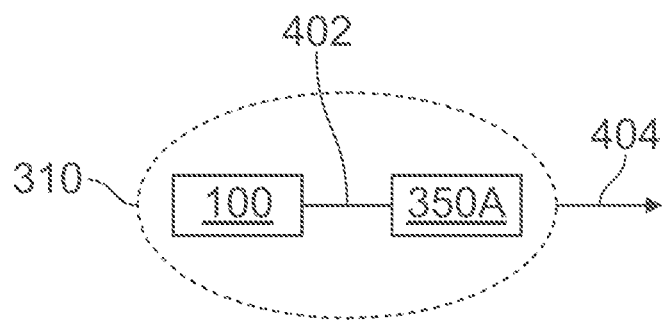
FIG. 4 illustrates an example of sharing energy between two vehicle systems in accordance with one embodiment.

At step 210, the receiving vehicle system receives energy from the donating vehicle system to charge the energy storage assembly of the receiving vehicle system while the donating and receiving vehicle systems are moving. For example, FIG. 4 illustrates an example of sharing energy between two vehicle systems in accordance with one embodiment. In the illustrated embodiment of FIG. 4, the receiving vehicle system has moved to a location within the intermediate location 310, which includes the location of the donating vehicle system. The donating vehicle system and the receiving vehicle system are moving in a direction 404 within the intermediate location. In the illustrated embodiment, the receiving vehicle system is trailing or moving behind the donating vehicle system, and the receiving and donating vehicle systems are moving along the same route. As one example, the receiving and donating vehicle systems may be rail vehicles, and the receiving and donating vehicle systems may be moving along the same track. As another example, the receiving and donating vehicle systems may be automobiles, and may be moving along the same road.

A link 402 extends between the donating vehicle system and the receiving vehicle system to allow the donating vehicle system to donate or share some energy from the energy storage assembly of the donating vehicle system with the energy storage assembly of the receiving vehicle system. In one embodiment, the energy is electric energy, and the link allows current to flow from the energy storage assembly of the donating vehicle system, and be received by the energy storage assembly of the receiving vehicle system. In another embodiment, the energy is a liquid energy such as diesel fuel, liquid hydrogen, gasoline, or the like. The link allows the liquid energy to flow from the energy storage assembly of the donating vehicle system and be received by the energy storage assembly of the receiving vehicle system.

Figure 5:
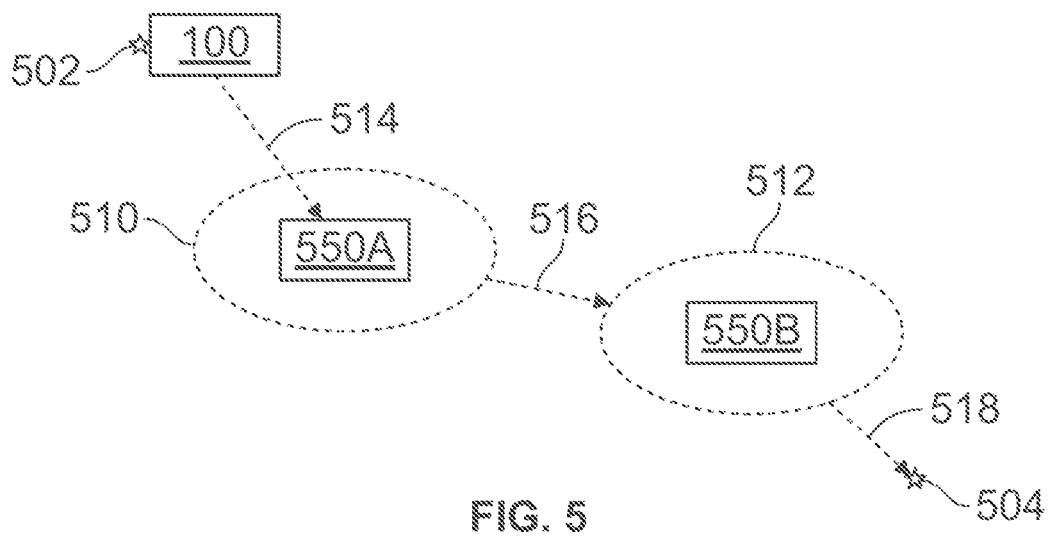
FIG. 5 illustrates a schematic of movement of plural vehicle systems in accordance with one embodiment.

In one or more embodiments, the controller may control operation of the receiving vehicle system to receive energy from two or more different donating vehicle systems. The determination for receiving energy from two or more donating vehicle systems may be based on the state of charge of each of the donating vehicle systems (e.g., an amount of energy each donating vehicle system is able to donate or give away), a location of each of the two or more donating vehicle system (e.g., relative to each other, relative to the receiving vehicle system, relative to the route along which the receiving vehicle moves, relative to the current location of the receiving vehicle system and/or the upcoming location of the receiving vehicle system, or the like). FIG. 5 illustrates a schematic of movement of plural vehicle systems in accordance with one embodiment. The receiving vehicle system 100 is positioned or located at a current location 502, and is moving or will be moving toward the upcoming location 504. The upcoming location may be the final destination of the receiving vehicle system, may be a charging station, a refueling station, a location of another donating vehicle system, or the like.

The controller of the receiving vehicle system may identify a first donating vehicle system 550A, and a first intermediate location 510 that includes a predicted location of the first donating vehicle system. The controller of the receiving vehicle system may control the receiving vehicle system to move toward the first intermediate location along a first route 514. The receiving vehicle system may receive part of the needed amount of energy to power the receiving vehicle system to the upcoming location from the first donating vehicle system while the receiving vehicle system and first donating vehicle systems are moving at the first intermediate location.

The controller of the receiving vehicle system may identify a second donating vehicle system 550B, and a second intermediate location 512 that includes a predicted location of the second donating vehicle system. The controller may control the receiving vehicle system to move from the first intermediate location toward the second intermediate location along a second route 516. The receiving vehicle system may receive additional energy (e.g., a remaining amount of the needed amount, or the like) from the second donating vehicle system while the receiving vehicle system and second donating vehicle system are moving at the second intermediate location. After the receiving vehicle system receives the additional energy from the second donating vehicle system, the controller may control movement of the receiving vehicle system to move toward the upcoming location along a route 518.

Figure 6:
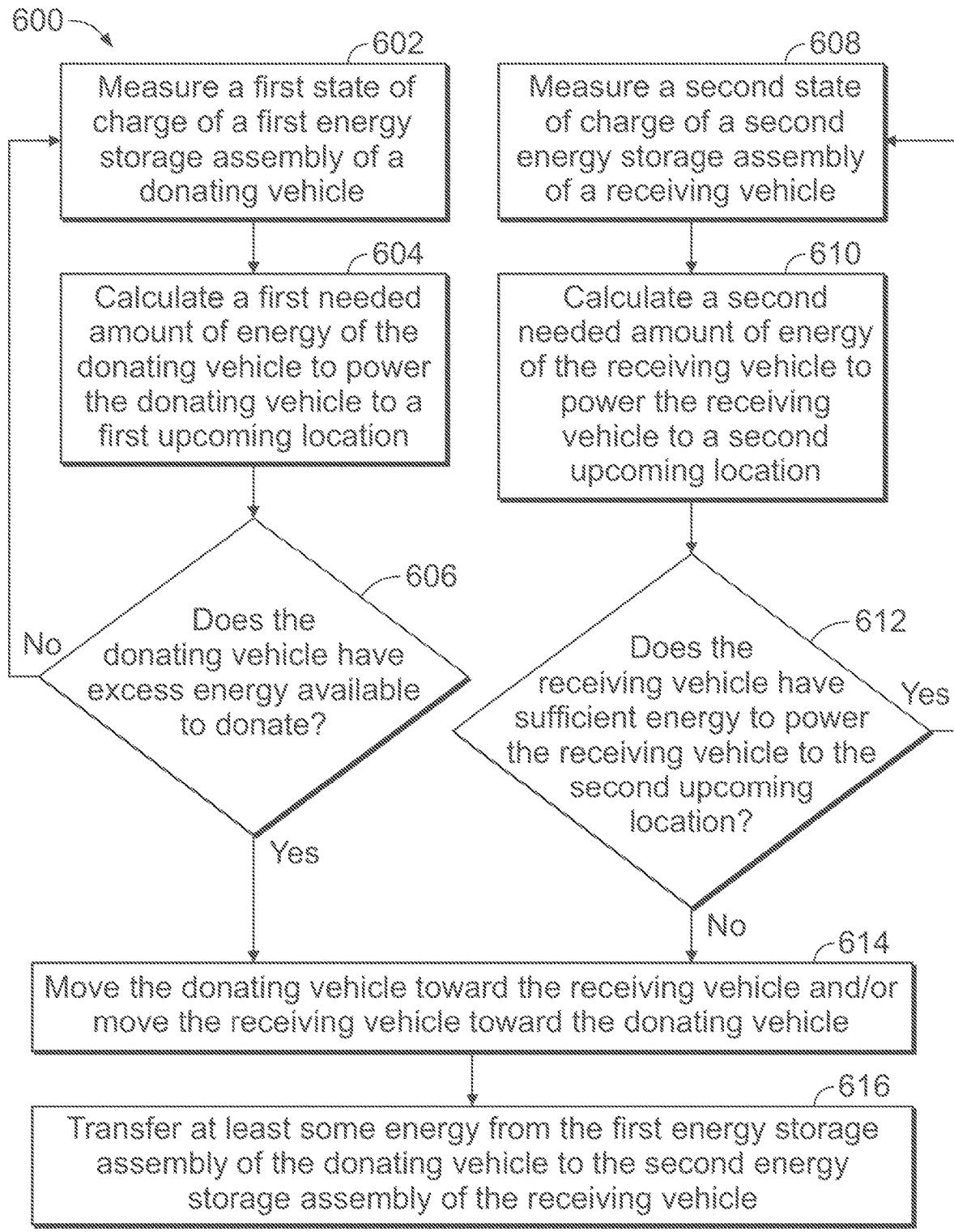
FIG. 6 illustrates a flowchart of one example of controlling the transfer of energy between two or more vehicle systems in motion in accordance with one embodiment.

In one or more embodiments, the donating vehicle system may be identified based on an amount of energy the donating vehicle system is able to donate. In one or more embodiments, the donating vehicle system may communicate with the receiving vehicle system to volunteer to be the donating vehicle system to donate energy to the receiving vehicle system. For example, FIG. 6 illustrates a flowchart 600 of one example of controlling the transfer of energy between two or more vehicle systems in motion in accordance with one embodiment. At step 602, a state of charge of an energy storage assembly of a donating vehicle system is measured. The state of charge may be measured and/or determined by sensors operably coupled with or disposed proximate to the energy storage assembly of the donating vehicle system. Optionally, the state of charge may be determined by a controller of the donating vehicle system, but an off-board controller (e.g., a dispatch center or back-office server, or the like). The state of charge may be determined within a predetermined percentage of energy remaining within and/or available to the donating vehicle system. In one or more embodiments, the state of charge of the donating vehicle system may be a first state of charge of a first energy storage assembly of the donating vehicle system.

At step 604, a first needed amount of energy of the donating vehicle system to power the donating vehicle system to a first upcoming location may be calculated and/or determined. The needed amount of energy may be based on a trip plan of the donating vehicle system, a schedule of the donating vehicle system, or the like. The trip plan and/or the schedule of the donating vehicle system may include a charging location (e.g., fueling station, electric charging location, or the like) where the donating vehicle system can charge the first energy storage assembly. In one or more embodiments, the first needed amount of energy of the donating vehicle system may be calculated based on the one or more charging locations. Optionally, the trip plan and/or the schedule of the donating vehicle system may include grades, curves, or predicted weather conditions that the donating vehicle system may traverse as the donating vehicle system travels along the route according to the trip plan and/or schedule. In one or more embodiments, the first needed amount of energy of the first energy storage assembly of the donating vehicle system may be calculated based on the grades, curves, and/or predicted weather conditions. In one or more embodiments, the trip plan and/or the schedule may include a scheduled arrival time or a required charging length of time of the donating vehicle system. The first needed amount of energy of the first energy storage assembly of the donating vehicle system may be calculated based on the schedule arrival time and/or the required charging length of time.

At step 606, a determination is made whether the donating vehicle system has excess energy available to donate. The determination may be based on the first state of charge of the first energy storage assembly relative to the first needed amount of energy to power the donating vehicle system to the upcoming location. If the donating vehicle system does not have excess energy available to donate, then flow of the method returns to step 602. Alternatively, if the donating vehicle system is determined to have excess energy available to donate, flow of the method proceeds toward step 614.

Prior to, simultaneously, or subsequently to the steps 602 through 606 being performed by the donating vehicle system, steps 608, 610, and 612 may also be performed, completed, conducted, or the like. For example, one or more of the steps 602 through 604 may be completed prior to one or more of the steps 608 through 612. Alternatively, one or more of the steps 602 through 604 may be completed about simultaneously as one or more of the steps 608 through 612. Alternatively, one or more of the steps 602 through 604 may be completed subsequent to one or more of the steps 608 through 612. Alternatively, the various steps of the method of the flowchart illustrated in FIG. 6 may be completed in an alternative order.

At step 608, a second state of charge of a second energy storage assembly of a receiving vehicle is measured. The state of charge of the receiving vehicle system may be measured and/or determined by sensors operably coupled with or disposed proximate to the energy storage assembly of the receiving vehicle system. Optionally, the state of charge may be determined by a controller of the receiving vehicle system, but an off-board controller (e.g., a dispatch center or back-office server, or the like). The second state of charge may be determined within a predetermined percentage of energy remaining within and/or available to the receiving vehicle system.

At step 610, a second needed amount of energy of the receiving vehicle system to power the receiving vehicle system to a second upcoming location is calculated. The needed amount of energy may be based on a trip plan of the receiving vehicle system, a schedule of the receiving vehicle system, or the like. The trip plan and/or the schedule of the receiving vehicle system may include a charging location (e.g., fueling station, electric charging location, or the like) where the receiving vehicle system can charge the second energy storage assembly, and the second needed amount of energy of the receiving vehicle system may be calculated based on the one or more charging locations. Optionally, the trip plan and/or the schedule of the receiving vehicle system may include grades, curves, or predicted weather conditions that the receiving vehicle system may traverse as the receiving vehicle system travels along the route according to the trip plan and/or schedule, and the second needed amount of energy of the second energy storage assembly of the receiving vehicle system may be calculated based on the grades, curves, and/or predicted weather conditions. In one or more embodiments, the trip plan and/or the schedule may include a scheduled arrival time or a required charging length of time of the receiving vehicle system, and the second needed amount of energy of the second energy storage assembly of the receiving vehicle system may be calculated based on the schedule arrival time and/or the required charging length of time.

At step 612, a determination is made whether the receiving vehicle system has sufficient energy to power the receiving vehicle system to the second upcoming location. The determination may be made by the controller onboard the receiving vehicle system, by a controller off-board the receiving vehicle system, and/or by an operator of the receiving vehicle system (e.g., onboard and/or off-board the receiving vehicle system). If the receiving vehicle system has sufficient energy to reach the second upcoming location of the receiving vehicle system, then flow of the method returns to 608. Alternatively, if it is determined that the receiving vehicle system does not have sufficient power to power the receiving vehicle system to the second upcoming location, then flow of the method proceeds toward 614.

At step 614, the donating vehicle system is moved toward the receiving vehicle system and/or the receiving vehicle system is moved toward the donating vehicle system. At step 616, at least some of the excess energy of the first energy storage assembly of the donating vehicle system is transferred to the second energy storage assembly of the receiving vehicle system. For example, the donating vehicle system shares some of the excess energy of the first energy storage assembly of the donating vehicle system with the second energy storage assembly of the receiving vehicle system to increase the state of charge of the second energy storage assembly of the receiving vehicle system. Increasing the state of charge of the second energy storage assembly of the receiving vehicle system provides the second energy storage assembly with sufficient energy to power the receiving vehicle system to at least the second upcoming location. In one embodiment, the first energy storage assembly of the donating vehicle system may be coupled with the second energy storage assembly of the receiving vehicle system via one or more conduits, buses, cables, wires, hoses, or the like. Optionally, the donating vehicle system may transfer at least some of the excess energy via a wireless connection. For example, the energy may be electric energy, and may be wirelessly transferred or shared with the receiving vehicle system.

In one or more embodiments, the transfer of energy from the first energy storage assembly of the donating vehicle system to the second energy storage assembly of the receiving vehicle system may occur while both the donating vehicle system and the receiving vehicle system are moving. Optionally, the transfer of energy from the donating vehicle system to the receiving vehicle system may occur while both the donating vehicle system and the receiving vehicle system are stationary. Optionally, the transfer of energy from the donating vehicle system to the receiving vehicle system may occur while the donating vehicle system and the receiving vehicle system are next time each other in a vehicle yard, a parking lot, a storage shed, or the like. Optionally, the donating vehicle system may not be next to the receiving vehicle system in the vehicle yard, the parking lot, or the storage shed. For example, the donating vehicle system may be disposed at a first location within a vehicle yard, and the receiving vehicle system may be disposed at a different, second location within the vehicle yard that is separated from the first location by about 5 meters, about 10 meters, about 50 meters, about 100 meters, or the like.

In one or more embodiments, the donating vehicle system may have at least some excess energy to transfer to the receiving vehicle system, but the receiving vehicle system may still need additional energy to power the receiving vehicle system to the second upcoming location of the receiving vehicle system. For example, the donating vehicle system may be a first donating vehicle system. The receiving vehicle system may receive a portion of energy from the first donating vehicle system, and then may receive another portion of energy from a second donating vehicle system. In one embodiment, the second upcoming location of the receiving vehicle system may be a current or predicted upcoming location of the second donating vehicle system.

Figure 7:
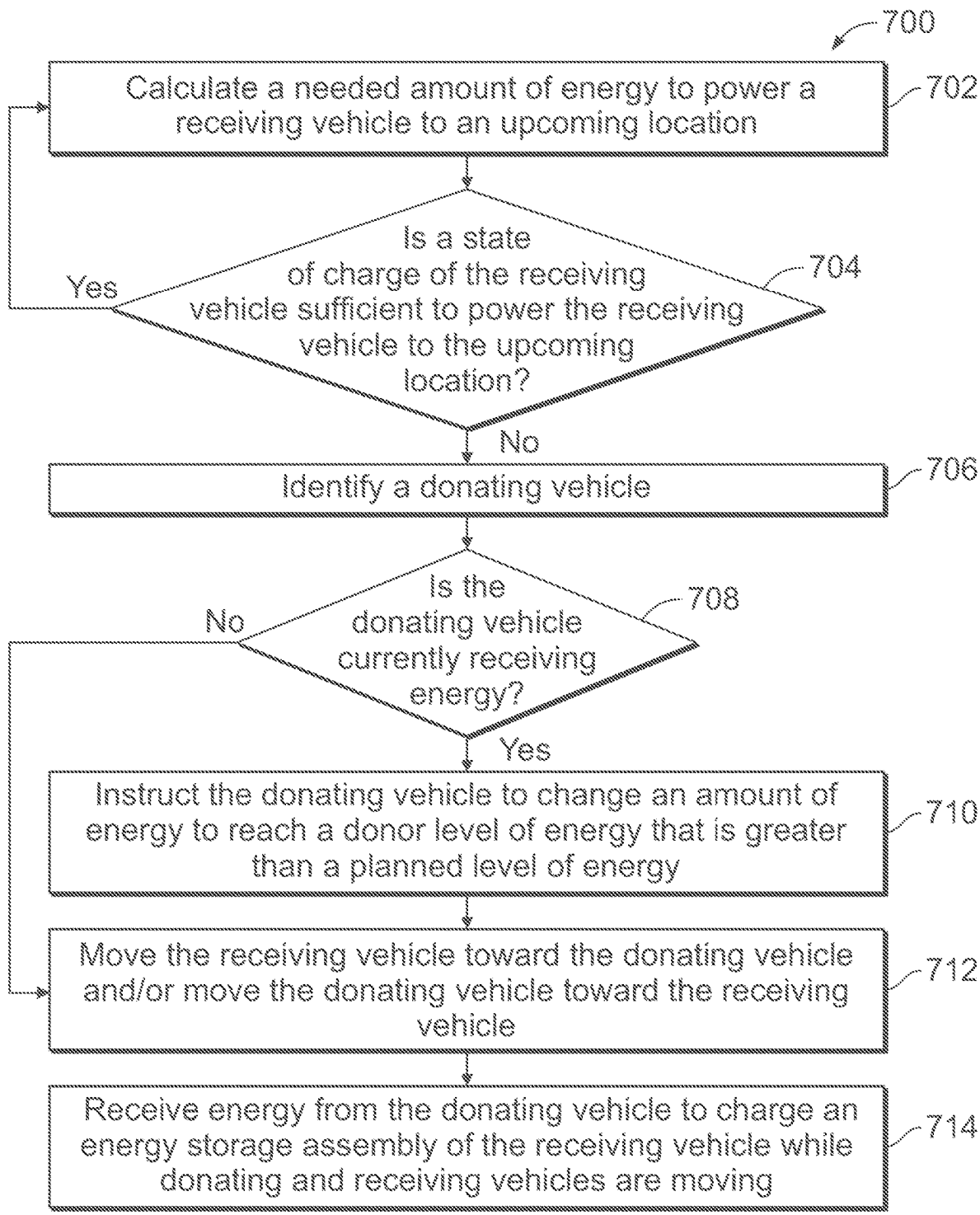
FIG. 7 illustrates a flowchart of one example of controlling the transfer of energy between two or more vehicle systems in motion in accordance with one embodiment.

FIG. 7 illustrates a flowchart 700 of another example of a method of controlling the transfer of energy between two or more vehicle systems in accordance with one embodiment. At step 702, a needed amount of energy to power a receiving vehicle to an upcoming location is calculated. The needed amount of energy may be based on the trip plan and/or a schedule of the receiving vehicle system. At step 704, a determination is made whether the state of charge of the energy storage assembly of the receiving vehicle system is sufficient to power the receiving vehicle system to the upcoming location. If the state of charge is sufficient based on the calculated needed amount of energy, flow of the method returns to step 702, and the method may continue while the receiving vehicle is in operation, for a predetermined length of time, until the state of charge of the receiving vehicle system reaches a predetermined threshold, or the like.

Alternatively, if it is determined that the state of charge of the energy storage assembly is insufficient to power the receiving vehicle to the upcoming location, flow of the method proceeds toward 706. At step 706, the receiving vehicle identifies a donating vehicle that may transfer some energy to the receiving vehicle system to increase the state of charge of the energy storage assembly of the receiving vehicle system. In one embodiment, the donating vehicle may be identified based on a trip plan and/or schedule of the donating vehicle relative to the trip plan and/or schedule of the receiving vehicle. In another embodiment, the donating vehicle may be identified based on the make and/or model of the donating vehicle system. In another embodiment, the donating vehicle may be identified based on a predicted upcoming location of the donating vehicle. In another embodiment, the donating vehicle may be identified based on the state of charge of the energy storage assembly of the donating vehicle system. Optionally, the donating vehicle may be identified based on any alternative characteristics of the donating vehicle, the receiving vehicle, or the like.

At step 708, a determination is made whether the donating vehicle is currently receiving energy. For example, the donating vehicle may be receiving energy from another donating vehicle, from a recharging or refueling station, or the like. If it is determined that the donating vehicle is not currently receiving energy, flow of the method proceeds toward 712. Alternatively, if it is determined that the donating vehicle is currently, or will be receiving energy, flow of the method proceeds toward step 710.

At step 710, the controller of the receiving vehicle, the controller of the donating vehicle, or a controller off-board the donating and receiving vehicles, may instruct the donating vehicle to change an amount of energy the donating vehicle should receive to reach a donor level of energy that is greater than a planned level of energy. For example, the donating vehicle may be planning to receive a planned level or amount of energy from an energy source (e.g., charging station, fueling station, another donating vehicle, or the like) based on a needed amount of energy of the donating vehicle to reach the upcoming location of the donating vehicle. The donating vehicle may be instructed to receive an amount of energy from the energy source in order to reach a donor level of energy that is greater than the planned level of energy. For example, the donor level of energy may be the planned level of energy plus additional excess energy that the donating vehicle may transfer to the receiving vehicle.

At step 712, subsequent to the energy storage assembly of the donating vehicle receiving the donor level of energy, the receiving vehicle is moved toward the donating vehicle and/or the donating vehicle is moved toward the receiving vehicle. At step 714, the energy storage assembly of the receiving vehicle receives at least some energy from the donating vehicle to increase an amount or level of energy within the energy storage assembly of the receiving vehicle. The donating vehicle may transfer or donate the energy to the receiving vehicle while the receiving and donating vehicles are moving, or while the receiving and donating vehicles are stationary.

In one or more embodiments, the donating vehicle may be required to be charged or fueled to an excess level based on a governing policy. For example, the donating vehicle may be required to be charged or refueled up to 105% of a charging or fueling capacity of the donating vehicle, up to 110% of the charging or fueling capacity of the donating vehicle, of an anticipated need of the donating vehicle, or the like. In one embodiment, the donating vehicle may need to be recharged or refueled to the excess level regardless of a receiving vehicle needing to receive the transfer of energy from the donating vehicle. Optionally, the governing policy may require the donating vehicle to have a minimum level of energy at a predetermined percentage of completion of a trip of the donating vehicle. For example, at 50% of the trip of the donating vehicle, the governing policy may require the donating vehicle to have an energy level that is about 115% of the charging or fueling capacity of the donating vehicle. Optionally, a non-donating vehicle (e.g., a receiving vehicle) may become a donating vehicle during travel based on the non-donating vehicle maintaining a minimum level of energy based on the governing policy. For example, the non-donating vehicle may have an energy level reserve of about 115% at a point in the trip but the governing policy may only require a 105% energy level reserve. The non-donating vehicle may be able to donate about 10% of the energy reserve to another vehicle and maintain the minimum requirement of the policy.

In one or more embodiments, the energy reserve levels of plural different vehicles traveling within a predetermined region or area may be reviewed to determine whether a donating vehicle should be directed toward the predetermined region. For example, first and second vehicles may be moving through or within the predetermined area or region. The first vehicle may have an energy reserve requirement of 105% but may be determined to have an actual energy reserve level of 106% (e.g., the first vehicle has an excess of 1% of energy), and the second vehicle may have an energy reserve requirement of 110% but may be determined to have an actual energy reserve level of 111% (e.g., the second vehicle has an excess of 1% of energy). A controller off-board the first and second vehicles may determine that the area or region in which the first and second vehicles are traveling do not require an additional designated donating vehicle.

Alternatively, the first vehicle may have an actual energy reserve level of 90% (e.g., the energy level of the first vehicle is deficient by 15%) and the second vehicle may have an actual energy reserve level of 100% (e.g., the energy level of the second vehicle is deficient by 10%). The off-board controller may instruct a donating vehicle to move toward the predetermined area or region the first and second vehicles are moving through to donate energy to the first and/or second vehicles. Optionally, the off-board controller may instruct the donating vehicle to recharge or refuel to an energy level that exceeds a governing energy level reserve requirement prior to moving to the predetermined area. For example, the donating vehicle may be required to have an excess reserve of about 115%, but the off-board controller may instruct the donating vehicle to recharge or refuel to reach an excess energy level of about 125% (e.g., 10% above the requirement).

Optionally, a donating vehicle may be unavailable to move to the predetermined area or region, and one of the first or second vehicles may be required to become a sacrificial vehicle and donate energy to the other non-sacrificial vehicle. The sacrificial vehicle may be determined based on a priority rank or level between the first and second vehicles. For example, the sacrificing vehicle may be the vehicle with the lower priority rank relative to the priority rank of the other vehicle. As one example, the controller may determine that the first vehicle system is carrying cargo that has a greater importance than the cargo being transported by the second vehicle. As another example, the controller may determine that the first vehicle has a more sensitive time of delivery than a time of delivery of the second vehicle. As another example, the controller may determine that the second vehicle may have the time and ability to schedule a stop for energy to recharge or refuel somewhere along the route the second vehicle is traveling. Additionally or alternatively, the controller may determine that the first vehicle is unable to schedule a stop to recharge or refuel. Optionally, the controller may determine that the second vehicle is to be the sacrificial vehicle based on the priority vehicle (e.g., the first vehicle) being encumbered for foreseen and/or unforeseen issues (e.g., congestion idling, last minute railcars added to the consist, a rerouting due to a route closure or outage, or the like).

The controller may instruct the second vehicle (e.g., the sacrificial vehicle) to donate a portion of the energy of the second vehicle to the first vehicle. For example, a portion of the energy of the second vehicle may be sacrificed and donated to the first vehicle to ensure that the first vehicle will have sufficient energy to complete a trip. In one embodiment, the second vehicle may be instructed to donate energy regardless of the second vehicle not having an excess reserve of energy. In another embodiment, the second vehicle may be instructed to donate energy regardless of the second vehicle not having enough energy to complete a trip, or the like.

In one or more embodiments, a method includes determining that a state of charge of an energy storage assembly of a receiving vehicle is insufficient to power the receiving vehicle to an upcoming location based on a difference between the state of charge of the energy storage assembly and a needed amount of energy from the energy storage assembly to power the receiving vehicle to the upcoming location. The receiving vehicle may be controlled to move to an intermediate location that includes an increased traffic area or to a first donating vehicle location of plural different donating vehicle locations. The increased traffic area has a greater vehicle density relative to a first reduced traffic area between a current location of the receiving vehicle and the increased traffic area or relative to a second reduced traffic area between the increased traffic area and the upcoming location of the receiving vehicle. The first donating vehicle location includes a predicted upcoming location of a first donating vehicle. The receiving vehicle receives energy from the first donating vehicle to charge the energy storage assembly of the receiving vehicle while both the first donating vehicle and the receiving vehicle area moving at the intermediate location.

Optionally, the needed amount of energy may be calculated to be less than the state of charge of the energy storage assembly of the receiving vehicle.

Optionally, the intermediate location may be a first intermediate location, and the receiving vehicle may receive only part of the needed amount of energy to power the receiving vehicle to the upcoming location. The receiving vehicle may be controlled to move to at least a second intermediate location, and may receive additional energy from at least a second donating vehicle to charge the energy storage assembly of the receiving vehicle while both the second donating vehicle and the receiving vehicle area moving at the second intermediate location.

Optionally, the receiving vehicle and the first donating vehicle may be a same type or modality of vehicles.

In one or more embodiments, a method includes measuring a first state of charge of a first energy storage assembly of a donating vehicle, and calculating a first needed amount of energy from the first energy storage assembly of the donating vehicle to power the donating vehicle to at least a first upcoming location. A second state of charge of a second energy storage assembly of a receiving vehicle is measured, and a second needed amount of energy from the second energy storage assembly to power the receiving vehicle to at least a second upcoming location is calculated. The second state of charge of the second energy storage assembly of the receiving vehicle is increased by transferring at least part of energy store in the first energy storage assembly of the donating vehicle to the second energy storage assembly of the receiving vehicle. The second state of charge of the second energy storage assembly is increased to provide the second energy storage assembly with sufficient energy to power the receiving vehicle to at least the second upcoming location.

Optionally, the second state of charge of the second energy storage assembly may be increased by transferring at least part of the energy storage in the first energy storage assembly responsive to determining that the first needed amount of energy from the first energy storage assembly of the donating vehicle to power the donating vehicle to at least the first upcoming location is no greater than the first state of charge of the first energy storage assembly of the donating vehicle.

Optionally, the second state of charge of the second energy storage assembly may be increased by transferring at least part of the energy storage in the first energy storage assembly responsive to determining that the second needed amount of energy from the second energy storage assembly of the receiving vehicle to power the receiving vehicle to at least the second upcoming location is no greater than the second state of charge of the second energy storage assembly of the receiving vehicle.

Optionally, increasing the second state of charge of the second energy storage assembly of the receiving vehicle by transferring at least part of the energy stored in the first energy storage assembly of the donating vehicle to the second energy storage assembly of the receiving vehicle occurs while both the donating vehicle and the receiving vehicle are moving.

Optionally, increasing the second state of charge of the second energy storage assembly of the receiving vehicle by transferring at least part of the energy stored in the first energy storage assembly of the donating vehicle to the second energy storage assembly of the receiving vehicle occurs while both the donating vehicle and the receiving vehicle are stationary.

Optionally, increasing the second state of charge of the second energy storage assembly of the receiving vehicle by transferring at least part of the energy stored in the first energy storage assembly of the donating vehicle to the second energy storage assembly of the receiving vehicle occurs while both the donating vehicle and the receiving vehicle are next to each other in one or more of a vehicle yard or a parking lot.

Optionally, increasing the second state of charge of the second energy storage assembly of the receiving vehicle by transferring at least part of the energy stored in the first energy storage assembly of the donating vehicle to the second energy storage assembly of the receiving vehicle occurs while both the donating vehicle and the receiving vehicle are not next to each other in one or more of a vehicle yard or a parking lot.

Optionally, one or both of the first upcoming location or the second upcoming location may be a location of a charging station.

Optionally, one or both of the first upcoming location or the second upcoming location may be a final destination of a trip of the receiving vehicle.

Optionally, the donating vehicle may be a first donating vehicle. One or both of the first upcoming location or the second upcoming location may be a current or predicted upcoming location of a second donating vehicle.

Optionally, one or both of the first needed amount of energy or the second needed amount of energy may be calculated based on a trip plan or a schedule of one or both of the donating vehicle or the receiving vehicle.

Optionally, the trip plan or the schedule may include one or more charging locations where the donating vehicle or the receiving vehicle can charge the corresponding first energy storage assembly or the second energy storage assembly. One or both of the first needed amount of energy or the second needed amount of energy may be calculated based on the one or more charging locations.

Optionally, the trip plan or the schedule may include one or more grades, curves, or predicted weather conditions. One or both of the first needed amount of energy or the second needed amount of energy may be calculated based on the one or more grades, curves, or predicted weather conditions.

Optionally, the trip plan or the schedule may include one or more of a scheduled arrival time or a required charging length of time for one or both of the donating vehicle or the receiving vehicle. One or both of the first needed amount of energy or the second needed amount of energy may be calculated based on the scheduled arrival time or the required charging length of time.

In one or more embodiments, a vehicle system includes an energy storage assembly disposed onboard a receiving vehicle. A controller includes one or more processors configured to determine a state of charge of the energy storage assembly to power the receiving vehicle to an upcoming location based on a needed amount of energy from the energy storage assembly to power the receiving vehicle to the upcoming location. The controller is configured to control the receiving vehicle to move to an intermediate location that includes an increased traffic area or to a first donating vehicle location of plural different donating vehicle locations. The increased traffic area has a greater vehicle density relative to a first reduced traffic area between a current location of the receiving vehicle and the increased traffic area, or a second reduced traffic area between the increased traffic area and the upcoming location of the receiving vehicle. The first donating vehicle location includes a predicted upcoming location of a first donating vehicle. The energy storage assembly receives energy from the first donating vehicle to charge the energy storage assembly of the receiving vehicle while both the first donating vehicle and the receiving vehicle area moving at the intermediate location.

Optionally, the receiving vehicle and the first donating vehicle are a same type or modality of vehicles.

Unless otherwise specified, "location" includes specific points and also areas and regions, which may be delineated or designated. In one aspect, a location may be elongate, e.g., a distance along vehicle route. In another aspect, a location may be a relatively small area or region, such as a vehicle yard, vehicle depot, or vehicle switching area, or the location may be elongate with a relatively short length, e.g., of no more than 2300 meters (this example reflecting a typical maximum length of a rail track siding).

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and clauses, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and clauses, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The clauses define the patentable scope of the disclosure, and include other examples that occur to those of ordinary skill in the art. Such other examples are intended to be within the scope of the clauses if they have structural elements that do not differ from the literal language of the clauses, or if they include equivalent structural elements with insubstantial differences from the literal language of the clauses.

What is claimed is:

1. A method comprising:
    determining that a state of charge of an energy storage assembly of a receiving vehicle is insufficient to power the receiving vehicle to an upcoming location based on a difference between the state of charge of the energy storage assembly and a needed amount of energy from the energy storage assembly to power the receiving vehicle to the upcoming location;
    controlling the receiving vehicle to move to an intermediate location that includes an increased traffic area or to a first donating vehicle location of plural different donating vehicle locations, the increased traffic area having a greater vehicle density relative to a first reduced traffic area between a current location of the receiving vehicle and the increased traffic area or relative to a second reduced traffic area between the increased traffic area and the upcoming location of the receiving vehicle, the first donating vehicle location including a predicted upcoming location of a first donating vehicle; and
    receiving energy from the first donating vehicle to charge the energy storage assembly of the receiving vehicle while both the first donating vehicle and the receiving vehicle are moving at the intermediate location.

2. The method of claim 1, wherein the needed amount of energy is calculated to be less than the state of charge of the energy storage assembly of the receiving vehicle.

3. The method of claim 1, wherein the intermediate location is a first intermediate location, and the receiving vehicle receives only part of the needed amount of energy to power the receiving vehicle to the upcoming location, and further comprising:
    controlling the receiving vehicle to move to at least a second intermediate location; and
    receiving additional energy from at least a second donating vehicle to charge the energy storage assembly of the receiving vehicle while both the second donating vehicle and the receiving vehicle are moving at the second intermediate location.

4. The method of claim 1, wherein the receiving vehicle and the first donating vehicle are a same type or modality of vehicles.

5. A method comprising:
    measuring a first state of charge of a first energy storage assembly of a donating vehicle;
    calculating a first needed amount of energy from the first energy storage assembly of the donating vehicle to power the donating vehicle to at least a first upcoming location;
    measuring a second state of charge of a second energy storage assembly of a receiving vehicle;
    calculating a second needed amount of energy from the second energy storage assembly to power the receiving vehicle to at least a second upcoming location; and
    increasing the second state of charge of the second energy storage assembly of the receiving vehicle by transferring at least part of energy stored in the first energy storage assembly of the donating vehicle to the second energy storage assembly of the receiving vehicle while both the donating vehicle and the receiving vehicle are moving, the second state of charge of the second energy storage assembly increased to provide the second energy storage assembly with sufficient energy to power the receiving vehicle to at least the second upcoming location.

6. The method of claim 5, wherein the second state of charge of the second energy storage assembly is increased by transferring at least part of the energy stored in the first energy storage assembly responsive to determining that the first needed amount of energy from the first energy storage assembly of the donating vehicle to power the donating vehicle to at least the first upcoming location is no greater than the first state of charge of the first energy storage assembly of the donating vehicle.

7. The method of claim 5, wherein the second state of charge of the second energy storage assembly is increased by transferring at least part of the energy stored in the first energy storage assembly responsive to determining that the second needed amount of energy from the second energy storage assembly of the receiving vehicle to power the receiving vehicle to at least the second upcoming location is no greater than the second state of charge of the second energy storage assembly of the receiving vehicle.

8. The method of claim 5, wherein increasing the second state of charge of the second energy storage assembly of the receiving vehicle by transferring at least part of the energy stored in the first energy storage assembly of the donating vehicle to the second energy storage assembly of the receiving vehicle occurs while both the donating vehicle and the receiving vehicle are stationary.

9. The method of claim 8, wherein increasing the second state of charge of the second energy storage assembly of the receiving vehicle by transferring at least part of the energy stored in the first energy storage assembly of the donating vehicle to the second energy storage assembly of the receiving vehicle occurs while both the donating vehicle and the receiving vehicle are next to each other in one or more of a vehicle yard or a parking lot.

10. The method of claim 8, wherein increasing the second state of charge of the second energy storage assembly of the receiving vehicle by transferring at least part of the energy stored in the first energy storage assembly of the donating vehicle to the second energy storage assembly of the receiving vehicle occurs while both the donating vehicle and the receiving vehicle are not next to each other in one or more of a vehicle yard or a parking lot.

11. The method of claim 5, wherein one or both of the first upcoming location or the second upcoming location is a location of a charging station.

12. The method of claim 5, wherein one or both of the first upcoming location or the second upcoming location is a final destination of a trip of the receiving vehicle.

13. The method of claim 5, wherein the donating vehicle is a first donating vehicle, and one or both of the first upcoming location or the second upcoming location is a current or predicted upcoming location of a second donating vehicle.

14. The method of claim 5, wherein one or both of the first needed amount of energy or the second needed amount of energy are calculated based on a trip plan or a schedule of one or both of the donating vehicle or the receiving vehicle.

15. The method of claim 14, wherein the trip plan or the schedule includes one or more charging locations where the donating vehicle or the receiving vehicle can charge the corresponding first energy storage assembly or the second energy storage assembly, and the one or both of the first needed amount of energy or the second needed amount of energy are calculated based on the one or more charging locations.

16. The method of claim 14, wherein the trip plan or the schedule includes one or more grades, curves, or predicted weather conditions, and the one or both of the first needed amount of energy or the second needed amount of energy are calculated based on the one or more grades, curves, or predicted weather conditions.

17. The method of claim 14, wherein the trip plan or the schedule includes one or more of a scheduled arrival time or a required charging length of time for one or both of the donating vehicle or the receiving vehicle, and the one or both of the first needed amount of energy or the second needed amount of energy are calculated based on the one or more of the scheduled arrival time or the required charging length of time.

18. A vehicle system comprising:
an energy storage assembly disposed onboard a receiving vehicle; and
a controller comprising one or more processors configured to determine a state of charge of the energy storage assembly to power the receiving vehicle to an upcoming location based on a needed amount of energy from the energy storage assembly to power the receiving vehicle to the upcoming location,
wherein the controller is configured to control the receiving vehicle to move to an intermediate location that includes an increased traffic area or a first donating vehicle location of plural different donating vehicle locations, the increased traffic area having a greater vehicle density relative to a first reduced traffic area between a current location of the receiving vehicle and the increased traffic area or a second reduced traffic area between the increased traffic area and the upcoming location of the receiving vehicle, the first donating vehicle location including a predicted upcoming location of a first donating vehicle, and
wherein the energy storage assembly is configured to receive energy from the first donating vehicle to charge the energy storage assembly of the receiving vehicle while both the first donating vehicle and the receiving vehicle are moving at the intermediate location.

19. The vehicle system of claim 18, wherein the receiving vehicle and the first donating vehicle are a same type or modality of vehicles.

* * * * *